United States Patent Office 3,319,818
Patented May 16, 1967

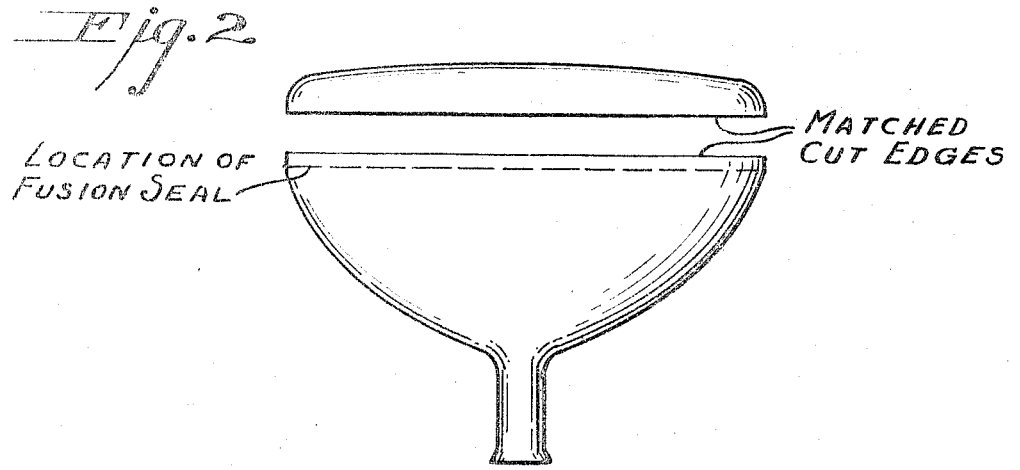

3,319,818
MANUFACTURE OF CATHODE RAY TUBES FOR COLOR TELEVISION
William H. Hudson, Corning, N.Y., assignor to Corning Glass Works, Corning, N.Y., a corporation of New York
Filed May 8, 1962, Ser. No. 193,286
6 Claims. (Cl. 220—2.1)

This invention relates to a method for manufacturing cathode ray tubes of the type used as picture tubes in color television receivers.

It is well known that in the manufacture of cathode ray tubes for color television, problems are encountered of a nature unknown in the manufacture of conventional black-and-white tubes. Among the dangers encountered in the manufacture of color tubes is the possibility of thermal damage to the color-producing components of the tubes, which components must be installed in the tubes prior to the final seals between the funnel and face plate portions of the tubes.

In order to avoid such damage, various solutions have been proposed. Such solutions usually involve the use of sealing agents having melting temperatures lower than those of the glass parts being joined. Although the use of such agents avoids thermal damage to the color-producing components of the tube, their use introduces additional problems not present when tubes are sealed by the conventional fusion method utilized in the sealing of tubes for black-and-white television. These problems result from the fact that a much greater degree of precision is required in forming the seal edges of components which are to be sealed using low-melting sealing agents than is required in forming these same edges when the components are subsequently to be sealed by heating the seal edges to their softening temperatures and effecting fusion therebetween, which process is herein referred to as "fusion sealing." When fusion sealing, for example the process disclosed in U.S. Patent 2,306,054, issued to E. M. Guyer is utilized, the entire surface of each seal edge is softened, and a consequence is that minor imperfections are obliterated during sealing. In addition, as presently practiced, such sealing is effected in the presence of a skilled operator, who is able to detect and compensate for seal edge defects in the respective components.

It is a very expensive process to mold and finish funnels and face plates having seal edges of precision sufficient to allow sealing by processes wherein the edges themselves are not reheated and reformed. The respective edges must have matching dimensions and must be flat and smooth in order to produce the necessary edge alignment and continuous contact along the length of the seal. As one solution to the problem of seal edge matching, it has been proposed to manufacture the respective components with seal edges having unequal widths. Thus, random variations in the circumferences of the seal edges are offset. Although this expedient, which is disclosed in U.S. Patent 3,002,645, issued to R. R. Kegg, may result in higher selection rates than are otherwise encountered, it will be apparent that the method does not compensate for lack of flatness in the respective seal edges.

It is, accordingly, an object of the present invention to provide a process for the manufacture of cathode ray tubes for color television wherein the advantages found in the use of low melting sealing agents can be utilized in conjunction with funnels and face plates manufactured to have seal edge precision no greater than that required for fusion sealing.

The process of the invention comprises in general the steps of sealing together a preformed funnel and a preformed face plate by means of fusion, cutting the resultant envelope into two portions, mounting the necessary color-producing components, and resealing the parts by means of a low-melting sealing agent. The invention also contemplates the cutting of fusion sealed envelopes along predetermined lines to allow for interchangeability among funnels and among face plates in the final sealing operation.

The process of the invention is illustrated in the accompanying drawings, in which:

FIG. 1 is a flow diagram illustrating the steps of the process, and

FIG. 2 is a plan view illustrating two tube portions prior to final sealing according to the invention.

In practicing the invention, funnels and face plates are formed according to presently known processes and to the standards of precision dictated by conditions in the manufacture of conventional black-and-white television. The parts are then sealed together by heating the respective seal edges and bringing them into contact to fuse the components together. The resultant envelope is allowed to cool and is then cut on a line generally transverse to the axis of symmetry of the bulb. Cutting may be accomplished by any of the methods known in the art, preferably by means of a rotating diamond saw.

After the fusion-sealed bulbs have been cut, the color-producing components, which term refers individually to each of the elements necessary to produce a color image on the viewing area of the tube, are installed in the respective portions, and the funnels and face plates are sealed along their cut edges by means of a low-melting sealing agent, for example that disclosed in U.S. Patent 2,889,952, issued to S. A. Claypoole. A particular advantage of the present process is that there is no need to polish the cut edges before the final sealing operation. The cut edges are perfectly matched, any unevenness in one surface being reflected by a complementary variation in the mating surface, and consequently there is no need to soften the respective final seal edges to smooth out uneven spots.

In the manufacture of funnels and face plaes, the greatest dimensional variations occur at and near the seal edges of the respective parts. For this reason, if fusion sealed bulbs are cut along lines which are spaced from the area of the seal, and if each bulb is cut in the same place, the resultant parts will be most easily interchangeable; that is, a funnel portion cut from one fusion-sealed envelope can most easily be subsequently sealed to a face plate portion cut from another fusion-sealed envelope. Although it will be found convenient, for purposes of installation of color-producing components and for resealing, to cut such bulbs along their intersections with planes perpendicular to their axes of symmetry, it will be understood that they may be cut along other lines, as long as such lines are identical for each bulb.

What is claimed is:

1. The method of forming a cathode ray tube for color television reception which comprises the steps of providing a glass funnel component and a glass face plate component, said components having generally complementary annular seal edges, sealing together said funnel component and said face plate component by applying heat to said edges to soften said edges and bringing said edges into contact to produce a fusion seal therebetween to form a single hollow glass envelope, separating said envelope to form a funnel portion and a face plate portion, said portions having complementary annular second seal edges, mounting a color-producing component in at least one of said portions, interposing between said second seal edges a sealing agent having a softening temperature lower than that of said edges, heating said sealing agent to its softening temperature, bringing said second seal edges together, and cooling said sealing agent to seal together said funnel portion and said face plate portion.

2. The method according to claim 1 in which said envelope is cut along a line spaced from the location of said fusion seal.

3. The method of forming a cathode ray tube for color television reception which comprises the steps of providing at least two glass envelopes each comprising a face plate component and a funnel component fused together to form a unitary structure, separating each envelope along a predetermined line, said lines following identical paths in each said envelope, thereby forming from each envelope a funnel portion and a face plate portion, each of said funnel portions having annular seal edges identical to one another and complementary to those of each of said face plate portions, juxtaposing two of said complementary seal edges and interposing therebetween a sealing agent having a softening temperature lower than that of said edges, heating said sealing agent to its softening temperature, and cooling said sealing agent to seal together a funnel portion and a face plate portion.

4. The method according to claim 3 in which said envelopes are cut along lines spaced from the juncture of said funnel component and said face plate component.

5. The method according to claim 3 in which said envelopes are cut along lines in planes perpendicular to the axes of symmetry of said envelope.

6. A cathode ray tube adapted for color television reception which comprises a funnel portion and a face plate portion, said portions being joined by an annular layer of a solidified low-melting sealing agent, interposed therebetween, one of said portions comprising two parts having generally complementary annular seal edges fused together to form said portion.

References Cited by the Examiner

UNITED STATES PATENTS

| | | | |
|---|---|---|---|
| 2,322,421 | 6/1943 | Cox | 316—17 |
| 2,598,524 | 5/1952 | Fouse | 65—56 X |
| 2,749,668 | 6/1956 | Chaffotte et al. | 65—43 |
| 2,889,952 | 6/1959 | Claypoole | 65—58 X |
| 2,922,216 | 1/1960 | McIlvaine | 29—25.13 |
| 2,966,997 | 1/1961 | Stutske | 220—2.1 |
| 3,002,645 | 10/1961 | Kegg | 65—58 X |

DONALL H. SYLVESTER, *Primary Examiner.*

T. E. CONDON, M. L. RICE, G. R. MYERS,
*Assistant Examiners.*